US011469435B2

United States Patent
Nishiyama

(10) Patent No.: US 11,469,435 B2
(45) Date of Patent: Oct. 11, 2022

(54) DUMMY ELECTRODE ASSEMBLY, FUEL CELL STACK, AND METHOD OF PRODUCING DUMMY ELECTRODE ASSEMBLY

(71) Applicant: HONDA MOTOR CO., LTD., Tokyo (JP)

(72) Inventor: Tadashi Nishiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/191,007

(22) Filed: Mar. 3, 2021

(65) Prior Publication Data
US 2021/0280891 A1 Sep. 9, 2021

(30) Foreign Application Priority Data

Mar. 4, 2020 (JP) .............................. JP2020-036582

(51) Int. Cl.
*H01M 8/04* (2016.01)
*H01M 8/2475* (2016.01)
*H01M 8/0276* (2016.01)
*H01M 8/04014* (2016.01)

(52) U.S. Cl.
CPC ....... *H01M 8/2475* (2013.01); *H01M 8/0276* (2013.01); *H01M 8/04014* (2013.01)

(58) Field of Classification Search
CPC ............. H01M 8/2475; H01M 8/0276; H01M 8/04014
See application file for complete search history.

(56) References Cited

U.S. PATENT DOCUMENTS

| 2004/0265667 | A1 | 12/2004 | Kato et al. | |
| 2006/0110649 | A1* | 5/2006 | Nishiyama | H01M 8/0263 429/457 |
| 2012/0321980 | A1* | 12/2012 | Goto | H01M 8/2483 429/463 |

FOREIGN PATENT DOCUMENTS

JP 4572062 B2 10/2010

* cited by examiner

*Primary Examiner* — Olatunji A Godo
(74) *Attorney, Agent, or Firm* — Carrier Blackman & Associates, P.C.; Joseph P. Carrier; Jeffrey T. Gedeon

(57) ABSTRACT

A dummy cell disposed at least at one end of a cell stack body in a fuel cell stack includes a dummy electrode assembly. The dummy electrode assembly includes a plate, and a pair of electrodes joined to both surfaces of the plate through adhesive layers, respectively. The adhesive layers are disposed only in a second area that lies outside a first area corresponding to a power generation area of a power generation cell in the dummy electrode assembly.

12 Claims, 6 Drawing Sheets

DUMMY ELECTRODE ASSEMBLY, FUEL CELL STACK, AND METHOD OF PRODUCING DUMMY ELECTRODE ASSEMBLY

CROSS-REFERENCE TO RELATED APPLICATION

This application is based upon and claims the benefit of priority from Japanese Patent Application No. 2020-036582 filed on Mar. 4, 2020, the contents of which are incorporated herein by reference.

BACKGROUND OF THE INVENTION

Field of the Invention

The present invention relates to a dummy electrode assembly, a fuel cell stack, and a method of producing the dummy electrode assembly.

Description of the Related Art

The fuel cell stack includes a cell stack body formed by stacking a plurality of power generation cells each forming a unit of a fuel cell. The power generation cell as a unit cell is formed by sandwiching a membrane electrode assembly (MEA) between a pair of separators.

The temperature at both ends of the cell stack body of a fuel cell stack in the stacking direction tends to be low since heat is radiated easily from both ends in comparison with the central side of the stack body. When the temperature at both ends of the cell stack body becomes low and water condensation occurs, there is a concern that the performance of discharging the produced water from the fuel cell stack is degraded, and the power generation stability of the fuel cell stack is degraded.

In an attempt to address this problem, in a fuel cell stack disclosed in Japanese Patent No. 4572062, dummy cells which do not perform power generation are provided at both ends of the cell stack body. In the structure, since the dummy cells function as heat insulating layers at ends of the cell stack body, the decrease in the temperature of the power generation cells disposed adjacent to the ends of the cell stack body is suppressed.

SUMMARY OF THE INVENTION

The present invention has been made in relation to the above technique, and an object of the present invention is to eliminate influence on the power generation performance of the fuel cell stack by adhesive layers, in a dummy electrode assembly formed by joining a pair electrodes to both surfaces of a plate used instead of an electrolyte membrane through adhesive layers.

According to a first aspect of the present invention, a dummy electrode assembly is provided. The dummy electrode assembly has no power generation function and is used instead of a membrane electrode assembly, in a dummy cell. The dummy cell is disposed at least at one end of a cell stack body in a fuel cell stack. The cell stack body includes a plurality of power generation cells that are stacked together in a stacking direction. The dummy electrode assembly includes an electrically conductive plate used instead of an electrolyte membrane, and a pair of electrodes joined to both surfaces of the plate through adhesive layers, respectively. The pair of electrodes have different sizes in a plan view. The adhesive layers are disposed only in a second area that lies outside a first area corresponding to a power generation area of the power generation cell, in the dummy electrode assembly.

According to a second aspect of the present invention, a fuel cell stack is provided. A fuel cell stack includes a cell stack body including a plurality of power generation cells stacked together. A dummy cell is disposed at least at one end of the cell stack body in the stacking direction. The dummy cell includes a dummy electrode assembly having no power generation function, instead of a membrane electrode assembly. The dummy electrode assembly includes a plate used instead of an electrolyte membrane, and a pair of electrodes joined to both surfaces of the plate through adhesive layers respectively. The pair of electrodes have different sizes in a plan view. The adhesive layers are disposed only in a second area that lies outside a first area corresponding to a power generation area of the power generation cell in the dummy electrode assembly.

According to a third aspect of the present invention, a method of producing a dummy electrode assembly is provided. The dummy electrode assembly has no power generation function and is used instead of a membrane electrode assembly in a dummy cell. The dummy cell is disposed at least at one end of a cell stack body in a fuel cell stack. The cell stack body includes a plurality of power generation cells that are stacked together in a stacking direction. The method includes a member providing step of providing a plate used instead of an electrolyte membrane, and a pair of electrodes having different sizes in a plan view, and a joining step of joining the pair of electrodes to both surfaces of the plate through adhesive layers, respectively. In the joining step, the adhesive layers are disposed only in a second area that lies outside a first area corresponding to a power generation area of the power generation cell, in the dummy electrode assembly.

In the present invention, in the dummy electrode assembly formed by joining a pair of electrodes respectively to both surfaces of the plate instead of using the electrolyte membrane through the adhesive layers, it is possible to eliminate the influence on the power generation performance of the fuel cell stack by the adhesive layers.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

DESCRIPTION OF THE PREFERRED EMBODIMENTS

Figure 1:
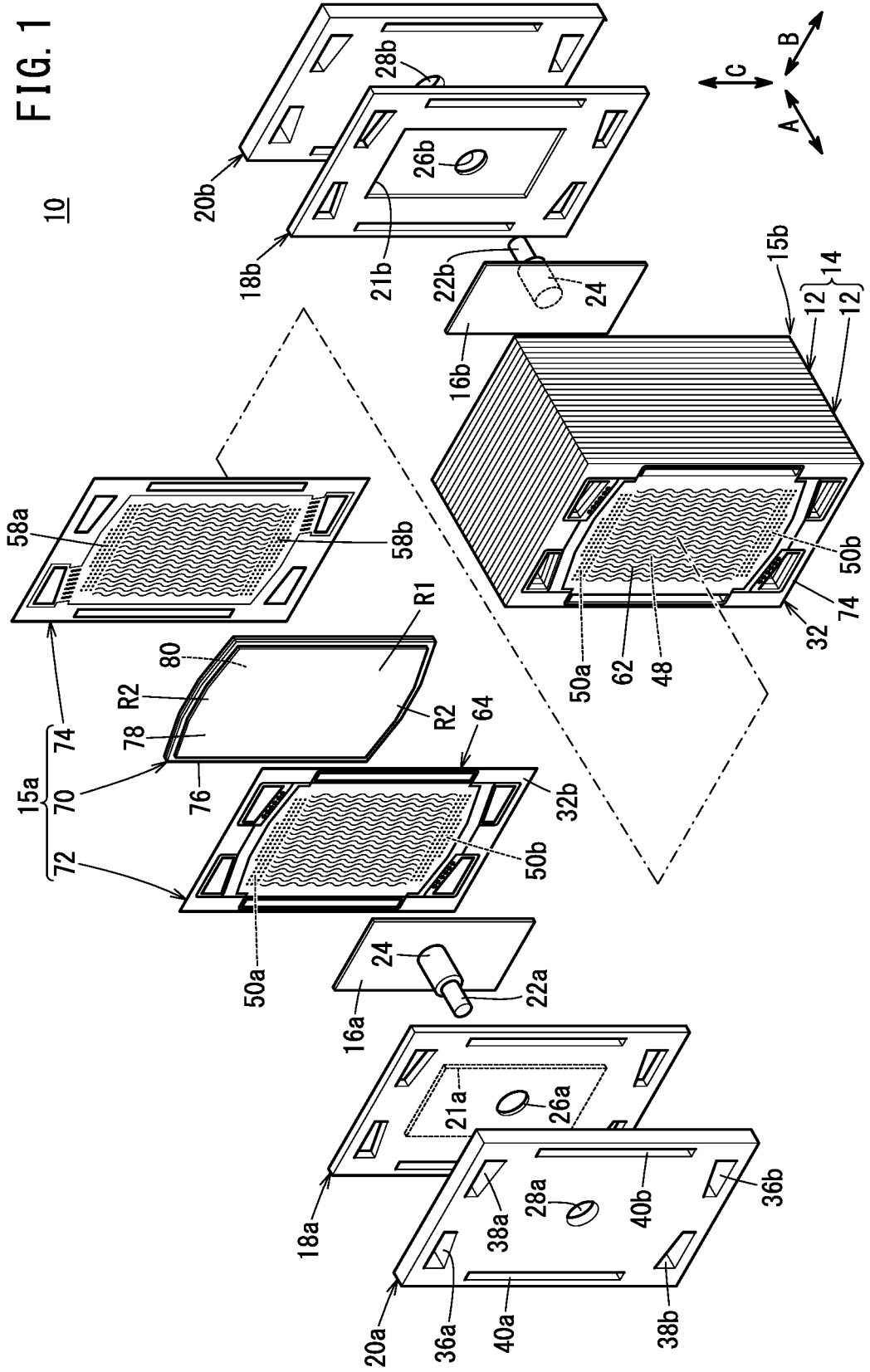
FIG. 1 is an exploded perspective view showing a fuel cell stack according to an embodiment of the present invention.

As shown in FIG. 1, a fuel cell stack 10 according to an embodiment of the present invention includes a stack body 14 formed by stacking a plurality of power generation cells 12 together in a horizontal direction (direction indicated by an arrow A). Each of the power generation cells functions as a unit fuel cell. At one end of the cell stack body 14 in the stacking direction (direction indicated by the arrow A), a dummy cell 15a is provided. A terminal plate 16a is provided outside the dummy cell 15a, an insulating plate 18a is provided outside the terminal plate 16a, and an end plate 20a is provided outside the insulating plate 18a. It should be noted that a plurality of dummy cells 15a may be disposed.

At the other end of the cell stack body 14 in the stacking direction, a dummy cell 15b is provided. A terminal plate 16b is provided outside the dummy cell 15b, an insulating plate 18b is provided outside the terminal plate 16b, and an end plate 20b is provided outside the insulating plate 18b. It should be noted that a plurality of dummy cells 15b may be disposed. For example, the components of the fuel cell stack 10 are held together in a box shaped casing (not shown) including the end plates 20a, 20b having a quadrangular shape. Alternatively, the components of the fuel cell stack 10 are tightened, and held together using a plurality of tie rods (not shown) extending in the direction indicated by the arrow A.

The terminal plates 16a, 16b are accommodated in rectangular recesses 21a, 21b formed in the insulating plates 18a, 18b. Terminals 22a, 22b are provided at substantially the center of the terminal plates 16a, 16b. The terminals 22a, 22b extend outward in the stacking direction. The terminals 22a, 22b are inserted into an insulating tubular body 24, through holes 26a, 26b of the insulating plates 18a, 18b, and holes 28a, 28b of the end plates 20a, 20b, and the terminals 22a, 22b protrudes outward from the casing.

Figure 2:
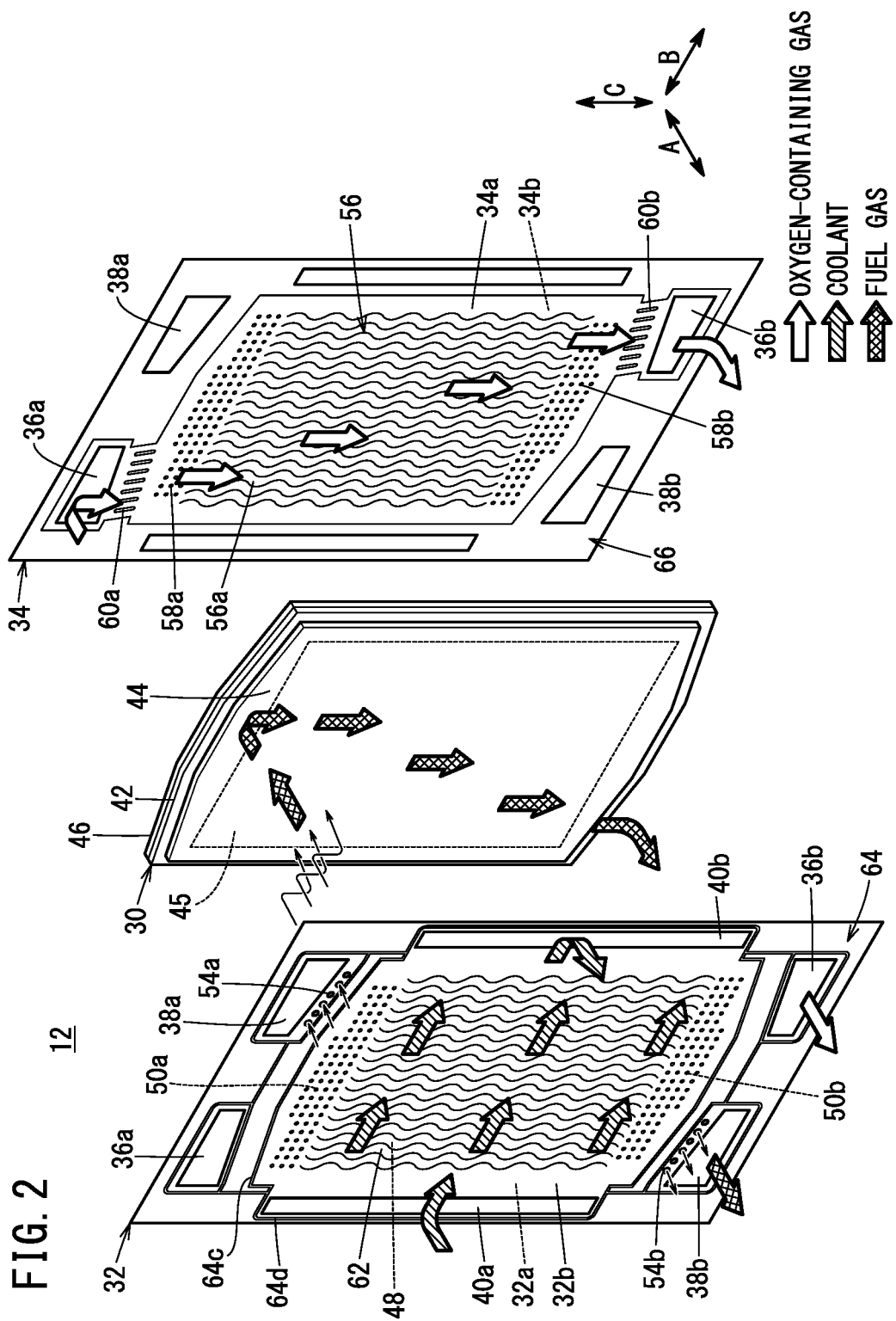
FIG. 2 is an exploded perspective view showing a power generation cell.

As shown in FIG. 2, each of the power generation cells 12 includes a membrane electrode assembly 30 (hereinafter referred to as the "MEA 30"), and first and second metal separators 32, 34 sandwiching the MEA 30. Each of the first and second metal separators 32, 34 is formed by corrugating a metal thin plate to have a recesses and ridges in cross section by press forming. The first and second metal separators 32, 34 have a longitudinally elongated shape, and have long sides oriented in the gravity direction (direction indicated by an arrow C) and short sides oriented in a horizontal direction (direction indicated by an arrow B).

At an upper end of the power generation cell 12 in the long side direction (direction indicated by the arrow C in FIG. 2), an oxygen-containing gas supply passage 36a for suppling an oxygen-containing gas and a fuel gas supply passage 38a for supplying a fuel gas are provided. The oxygen-containing gas supply passage 36a and the fuel gas supply passage 38a extend through the power generation cell 12 in the direction indicated by the arrow A. For example, the fuel gas is a hydrogen-containing gas.

At a lower end of the power generation cell 12 in the long side direction, a fuel gas discharge passage 38b for discharging the fuel gas and an oxygen-containing gas discharge passage 36b for discharging the oxygen-containing gas are provided. The fuel gas discharge passage 38b and the oxygen-containing gas discharge passage 36b extend through the power generation cell 12 in the direction indicated by the arrow A.

At one end of the power generation cell 12 in the short side direction (direction indicated by the arrow B), a coolant supply passage 40a for supplying the coolant is provided. At the other end of the power generation cell 12 in the short side direction, a coolant discharge passage 40b is provided. The coolant supply passage 40a and the coolant discharge passage 40b extend through the power generation cell 12 in the direction the direction indicated by the arrow A.

The MEA 30 includes an electrolyte membrane 42, and an anode 44 and a cathode 46 holding the electrolyte membrane 42. For example, the electrolyte membrane 42 is a thin membrane of perfluorosulfonic acid containing water.

The surface area of the anode 44 is smaller than the surface area of the cathode 46. Each of the anode 44 and the cathode 46 includes a gas diffusion layer (not shown) of a carbon paper, etc., and an electrode catalyst layer 45 formed by depositing porous carbon particles uniformly on the surface of the gas diffusion layer, and platinum alloy is supported on surfaces of the carbon particles (see FIG. 2). The electrode catalyst layer 45 is formed on each of both surfaces of the electrolyte membrane 42. It should be noted that the electrode catalyst layer 45 of the anode 44 and the electrode catalyst layer 45 of the cathode 46 may have different sizes (surface areas) in a plan view, and the outer peripheral positions of the electrode catalyst layers 45 may be shifted from each other in the surface direction.

Figure 3:
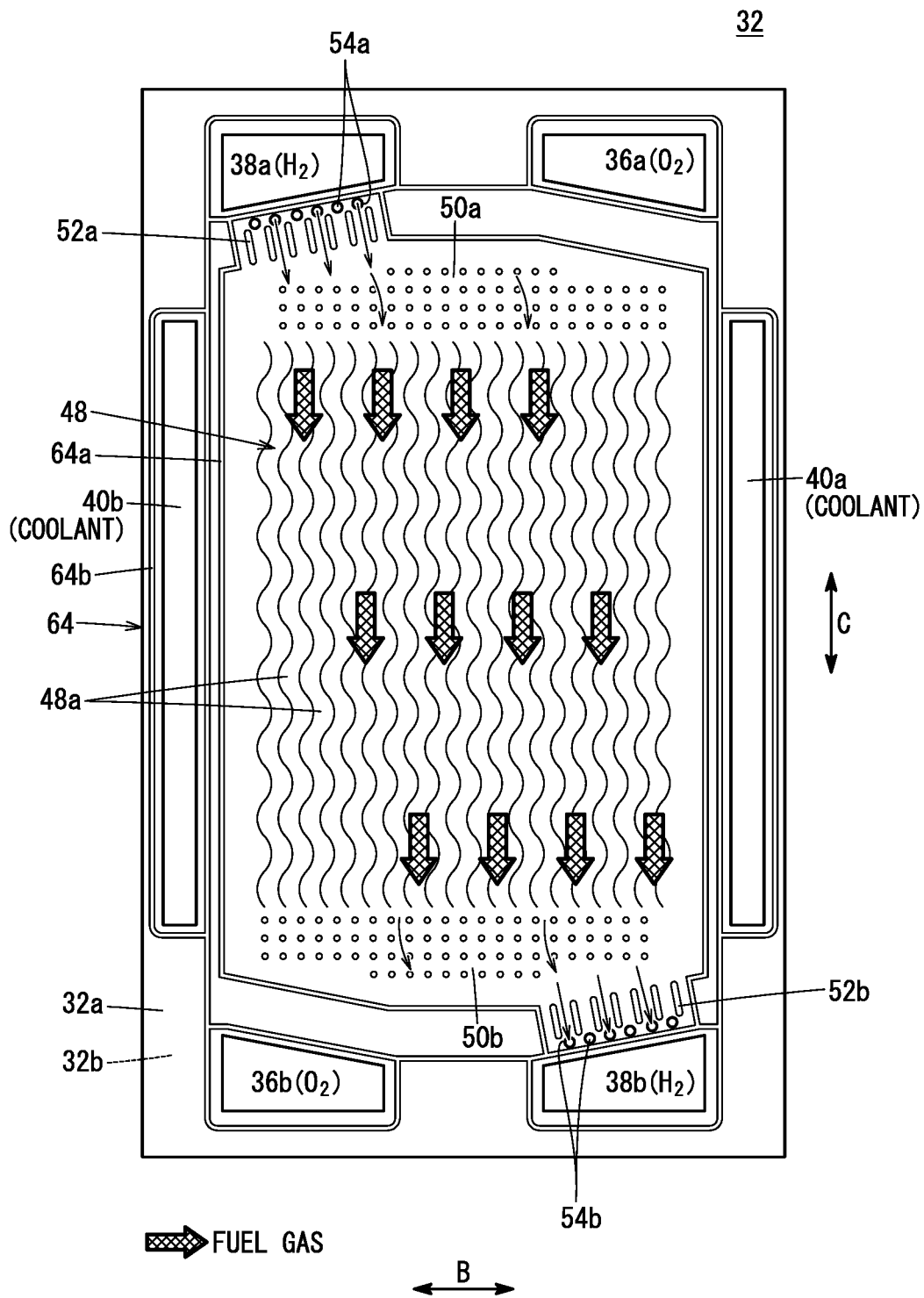
FIG. 3 is a plan view showing a first metal separator.

As shown in FIG. 3, the first metal separator 32 has a fuel gas flow field 48 on its surface 32a facing the MEA 30. The fuel gas flow field 48 is connected to the fuel gas supply passage 38a and the fuel gas discharge passage 38b. The fuel gas flow field 48 includes a plurality of wavy flow grooves 48a extending in the direction indicated by the arrow C. An inlet buffer 50a and an outlet buffer 50b are provided at an upper end and a lower end of the wavy flow grooves 48a in the direction indicated by the arrow C. A plurality of bosses are formed in each of the inlet buffer 50a and the outlet buffer 50b.

A plurality of receivers 52a and a plurality of receivers 52b are formed on the surface 32a of the first metal separator 32. The receivers 52a form a fluid channel connecting the fuel gas supply passage 38a and the inlet buffer 50a, and the receivers 52b form a fluid channel connecting the fuel gas discharge passage 38b and the outlet buffer 50b. A plurality of supply holes 54a and a plurality of discharge holes 54b are formed adjacent to the receivers 52a, 52b. The supply holes 54a are connected to the fuel gas supply passage 38a on the surface 32b. Likewise, the discharge holes 54b are connected to the fuel gas discharge passage 38b on the surface 32b.

As shown in FIG. 2, the second metal separator 34 has an oxygen-containing gas flow field 56 on its surface 34a facing the MEA 30. The oxygen-containing gas flow field 56 is connected to the oxygen-containing gas supply passage 36a and the oxygen-containing gas discharge passage 36b. The oxygen-containing gas flow field 56 includes a plurality of wavy flow grooves 56a extending in the direction indicated by the arrow C. An inlet buffer 58a and an outlet buffer 58b are provided at an upper and a lower end of the wavy flow grooves 56a in the direction indicated by the arrow C. A plurality of bosses are formed in each of the inlet buffer 58a and the outlet buffer 58b.

A plurality of receivers 60a are formed on a surface 34a of the second metal separator 34 and a plurality of receivers 60b are formed on the surface 34a of the second metal separator 34. The receivers 60a form a fluid channel connecting the oxygen-containing gas supply passage 36a and the inlet buffer 58a, and the receivers 60b form a fluid channel connecting the oxygen-containing gas discharge passage 36b and the outlet buffer 58b.

A coolant flow field 62 is formed between the surface 34b of the second metal separator 34 of one of the power generation cells 12 that are adjacent to each other (surface opposite to the surface 34a), and a surface 32b of the first metal separator 32 of the other of the power generation cells 12 that are adjacent to each other (surface opposite to the surface 32a). The coolant flow field 62 is connected to the coolant supply passage 40a and the coolant discharge passage 40b. This coolant flow field 62 is formed when the back surface of the fuel gas flow field 48 and the back surface of the oxygen-containing gas flow field 56 are overlapped together, and the coolant flow field 62 extends in the direction indicated by the arrow B.

As shown in FIGS. 2 and 3, a first seal member 64 is formed integrally with the surfaces 32a, 32b of the first metal separator 32, along the outer peripheral portion of the first metal separator 32. As shown in FIG. 2, a second seal member 66 is formed integrally with the surfaces 34a, 34b of the second metal separator 34, along the outer peripheral portion of the second metal separator 34. Further, for example, each of the first seal member 64 and the second seal member 66 is made of seal material, cushion material, or packing material such as an EPDM, an NBR, a fluororubber, a silicone rubber, a fluorosilicone rubber, a Butyl rubber, a natural rubber, a styrene rubber, a chloroprene rubber, or an acrylic rubber.

As shown in FIG. 3, the first seal member 64 has an inner seal 64a formed around the fuel gas flow field 48 on the surface 32a. An outer seal 64b is provided on the outer peripheral portion of the inner seal 64a. The outer seal 64b is provided around the oxygen-containing gas supply passage 36a, the oxygen-containing gas discharge passage 36b, the fuel gas supply passage 38a, the fuel gas discharge passage 38b, the coolant supply passage 40a, and the coolant discharge passage 40b.

As shown in FIG. 2, an inner seal 64c and an outer seal 64d are provided on a surface 32b of the first seal member 64. The inner seal 64c is a seal corresponding to the inner seal 64a (FIG. 3). The coolant flow field 62 is connected to the coolant supply passage 40a and the coolant discharge passage 40b. The outer seal 64d is a seal corresponding to the outer seal 64b (FIG. 3).

The second seal member 66 is a flat seal formed on both surfaces 34a, 34b of the second metal separator 34.

As shown in FIG. 1, the dummy cell 15a includes a dummy electrode assembly 70 having no power generation function and which is used instead of the MEA 30 (see FIG. 3), and a first dummy separator 72 and a second dummy separator 74 sandwiching the dummy electrode assembly 70. The dummy electrode assembly 70 includes a plate 76 having electrical conductivity and which is used instead of the electrolyte membrane 42, and a pair of electrodes 78, 80 joined to both surfaces of the plate 76, respectively. That is, unlike the MEA 30, the dummy electrode assembly 70 does not include any electrolyte membrane 42.

The plate 76 corresponds to the electrolyte membrane 42 of the power generation cell 12 (see FIG. 3), and has the same shape as the electrolyte membrane 42. For example, the plate 76 is a metal plate made of stainless steel. The plate 76 may be a carbon plate.

One of the electrodes 78 (hereinafter also referred to as the "first electrode 78") is disposed on one surface 76a of the plate 76. The other of the electrodes 80 (hereinafter also referred to as the "second electrode 80") is disposed on the other surface 76b of the plate 76. The plate 76 is held between the first electrode 78 and the second electrode 80.

The first electrode 78 corresponds to a gas diffusion layer of the anode 44, e.g., made of a carbon paper. The second electrode 80 corresponds to a gas diffusion layer of the cathode 46, e.g., made of a carbon paper. Unlike the anode 44 and the cathode 46, the first electrode 78 and the second electrode 80 do not have any electrode catalyst layer.

The first electrode 78 has the same shape as the anode 44. The second electrode 80 has the same shape as the cathode 46. Therefore, the first electrode 78 and the second electrode 80 have different sizes in a plan view. In the embodiment of the present invention, the second electrode 80 is larger than the first electrode 78 in a plan view. Specifically, the second electrode 80 protrudes outward from the outer edge of the first electrode 78 over the entire periphery.

Figure 4:
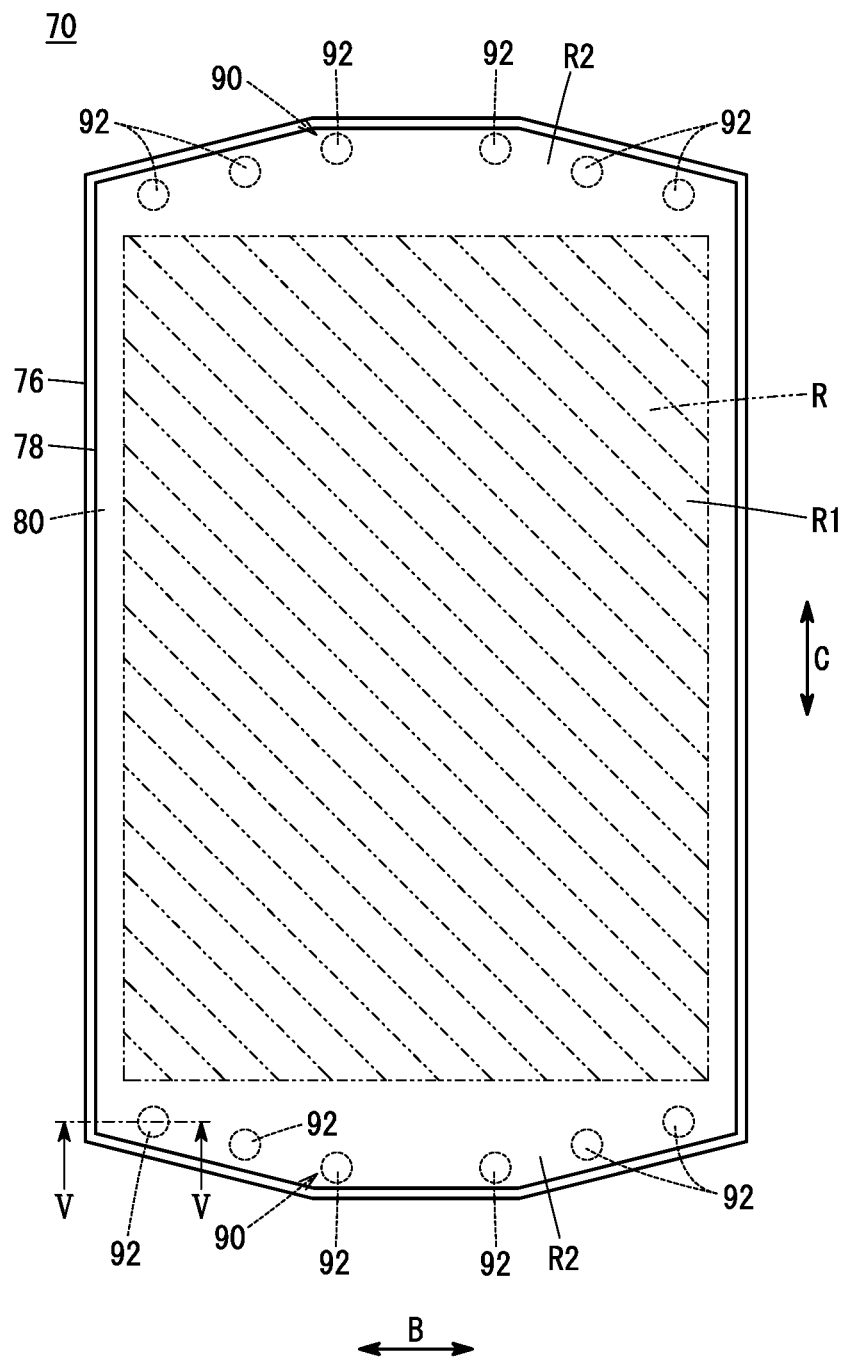
FIG. 4 is a plan view showing a dummy electrode assembly.
Figure 5:
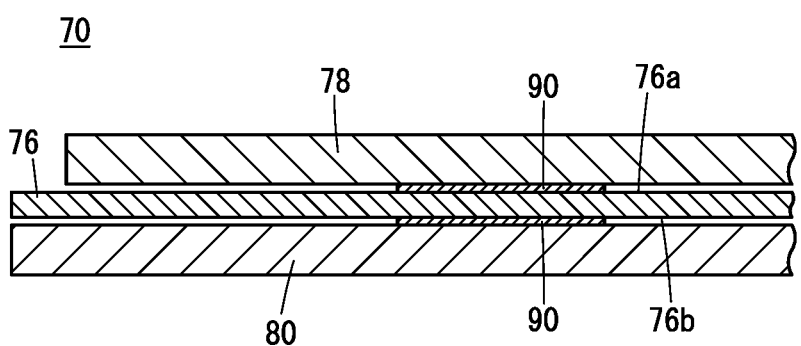
FIG. 5 is a cross sectional view taken along a line V-V in FIG. 4.

As shown in FIGS. 4 and 5, the first electrode 78 and second electrode 80 are joined to both surfaces of the plate 76 through adhesive layers 90. That is, the first electrode 78 is joined to one surface 76a of the plate 76 through the adhesive layer 90. The second electrode 80 is joined to the other surface 76b of the plate 76 through the adhesive layer 90.

The dummy electrode assembly 70 includes a first area R1 corresponding to a power generation area R of the power generation cell 12 in the dummy electrode assembly 70, and a second area R2 that lies outside the first area R1. The adhesive layers 90 are disposed only in the second area R2 that lies outside the first area R1 corresponding to the power generation area R. Therefore, the adhesive layers 90 are not disposed in the first area R1 corresponding to the power generation area R. The adhesive layers 90 may be positioned in a manner that the adhesive layers 90 are not overlapped with the anode 44 and the cathode 46 in the stacking direction of the power generation cells 12.

The power generation area R of the power generation cell 12 corresponds to the area where the electrode catalyst layer 45 of the power generation cell 12 is provided. That is, the power generation arear R is an area where the electrode catalyst layer 45 of the anode 44 and the electrode catalyst layer 45 of the cathode 46 are overlapped with each other in the thickness direction of the power generation cell 12 (in the direction indicated by the arrow A in FIG. 2). Further, the power generation area R corresponds to an area where the fuel gas flow field 48 and the oxygen-containing gas flow field 56 (see FIG. 2) are provided. In FIG. 4, the first area R1 of the dummy electrode assembly 70 corresponds to an area where the first electrode 78 is provided.

The adhesive layers 90 are provided at least at one end, of the dummy electrode assembly 70, of a direction in which reactant gases flow in the power generation cell 12 (direction indicated by the arrow C or the longitudinal direction of the dummy electrode assembly 70) (both ends in the embodiment of the present invention). In the embodiment shown in FIG. 4, the adhesive layer 90 is provided at each of an upper side and a lower side of the dummy electrode assembly 70 in the vertical direction.

The adhesive layers 90 are provided at positions corresponding to the buffers 50a, 50b, 58a, 58b (see FIG. 2) serving as gas channels adjacent to the power generation area R of the power generation cell 12, of the dummy electrode assembly 70. That is, the second area R2 where the adhesive layers 90 are provided is an area corresponding to the buffers 50a, 50b, 58a, 58b of the power generation cells 12. Each of the first dummy separator 72 and the second dummy separator 74 has the same structure as the first metal separator 32 and the second metal separator 34, and therefore has the buffers 50a, 50b, 58a, 58b.

Therefore, in FIG. 1, the second area R2 of the dummy electrode assembly 70 is disposed between the buffers 50a, 50b of the first dummy separator 72, and the buffers 58a, 58b of the second dummy separator 74. The protruding heights of the bosses of the buffers 50a, 50b, 58a, 58b are set to be suitably low. Therefore, in the state where the cells are stacked together (state where the tightening load is applied to the cell stack body), the second area R2 of the dummy electrode assembly 70 merely contacts bosses of the buffers 50a, 50b of the first dummy separator 72 and bosses of the buffers 58a, 58b of the second dummy separator 74. In effect, no tightening load in the stacking direction is applied to the second area R2.

In the embodiment shown in FIG. 4, the adhesive layer 90 is disposed between the upper side of the first electrode 78 and the upper side of the first area R1, which is an area corresponding to the electrode catalyst layer 45 (FIG. 2), (i.e., disposed in a position above the upper end of the first area R1 in the dummy electrode assembly 70). Further, the adhesive layer 90 is positioned between the lower side of the first electrode 78 and the lower side of the first area R1 (i.e., a position below the lower end of the first area R1 in the dummy electrode assembly 70).

In the second area R2, the adhesive layer 90 includes a plurality of dot-shaped adhesion portions 92. In the second area R2 on the upper side of the dummy electrode assembly 70, a plurality of dot-shaped adhesion portions 92 are spaced from each other in the horizontal direction (short side direction of the dummy electrode assembly 70). In the second area R2 on the lower side of the dummy electrode assembly 70, a plurality of dot-shaped adhesion portions 92 are spaced from each other in the horizontal direction.

In FIG. 1, the first dummy separator 72 has substantially the same structure as the first metal separator 32, and the second dummy separator 74 has substantially the same structure as the second metal separator 34. The constituent elements of the second dummy separator 74 that are identical to those of the second metal separator 34 are labelled with the same reference numerals, and the detailed description is omitted.

The other dummy cell 15b disposed at the other end of the cell stack body 14 has the same structure as one of the dummy cells 15a.

Figure 6:
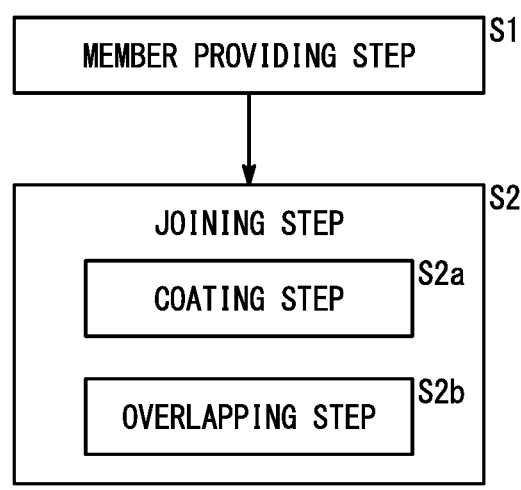
FIG. 6 is a flow chart showing a method of producing a dummy electrode assembly.

As shown in FIG. 6, a method of producing the dummy electrode assembly 70 includes a member providing step S1 and a joining step S2. In the member providing step S1, the plate 76 used instead of the electrolyte membrane 42, and the pair of electrodes 78, 80 having different sizes in a plan view are provided.

In the joining step S2, the pair of electrodes 78, 80 are joined respectively to both surfaces of the plate 76 through the adhesive layers 90. In the joining step S2, the adhesive layers 90 are disposed only in the second area R2 that lies outside the first area R1 corresponding to the power generation area R of the power generation cell 12 in the dummy electrode assembly 70.

The joining step S2 includes a coating step S2a of coating adhesive forming the adhesive layers 90. In the coating step S2a, the adhesive is coated on both surfaces of the plate 76 in a dot pattern. Instead of coating the adhesive on both surfaces of the plate 76, the adhesive may be coated on the first electrode 78 and the second electrode 80 in a dot pattern.

The joining step S2 includes an overlapping step S2b after the coating step S2a. In the overlapping step S2b, the first electrode 78, the plate 76, and the second electrode 80 are overlapped together as shown in FIG. 5, and the first electrode 78, the plate 76, and the second electrode 80 are stacked integrally with each other through the adhesive layers 90.

Operation of the fuel cell stack 10 having the above structure will be described below.

As shown in FIG. 1, in the fuel cell stack 10, an oxygen-containing gas is supplied to the oxygen-containing gas supply passage 36a, and a fuel gas is supplied to the fuel gas supply passage 38a. Further, the coolant such as pure water and ethylene glycol is supplied to the coolant supply passage 40a. Therefore, in the cell stack body 14, the oxygen-containing gas, the fuel gas, and the coolant are supplied, respectively, in the direction indicated by the arrow A, to the plurality of power generation cells 12 that are stacked together in the direction indicated by the arrow A.

As shown in FIG. 2, the oxygen-containing gas flows from the oxygen-containing gas supply passage 36a into the oxygen-containing gas flow field 56 of the second metal separator 34, and flows along the cathode 46 of the MEA 30.

At this time, on the surface 34a of the second metal separator 34, the oxygen-containing gas flowing through the oxygen-containing gas supply passage 36a is supplied to the inlet buffer 58a between the plurality of receivers 60a. The oxygen-containing gas supplied to the inlet buffer 58a is distributed in the direction indicated by the arrow B. The oxygen-containing gas flows along the plurality of wavy flow grooves 56a of the oxygen-containing gas flow field 56 downward in the vertical direction, and the oxygen-containing gas is supplied to the cathode 46 of the MEA 30.

In the meanwhile, as shown in FIG. 2, on the surface 32b of the first metal separator 32, the fuel gas flows from the fuel gas supply passage 38a through the plurality of supply holes 54a toward the surface 32a. As shown in FIG. 3, the fuel gas flows through the receivers 52a into the inlet buffer 50a. The fuel gas distributed through the inlet buffer 50a in the direction indicated by the arrow B move along the plurality of wavy flow grooves 48a of the fuel gas flow field 48, and the fuel gas is supplied to the anode 44 of the MEA 30.

Thus, in each of the MEAs 30, the oxygen-containing gas supplied to the cathode 46 and the fuel gas supplied to the anode 44 are consumed in electrochemical reactions in the electrode catalyst layers 45 to perform power generation.

Then, as shown in FIG. 2, the oxygen-containing gas supplied to the cathode 46 is consumed at the cathode 46, and the oxygen-containing gas is sent to the outlet buffer 58b connected to the lower part of the oxygen-containing gas flow field 56. Further, the oxygen-containing gas flows from the outlet buffer 58b along positions between the plurality of receivers 60b, and the oxygen-containing gas is discharged into the into the oxygen-containing gas discharge passage 36b.

Likewise, as shown in FIG. 3, the fuel gas supplied to the anode 44 is consumed at the anode 44, and the fuel gas is sent to the outlet buffer 50b connected to the lower part of the fuel gas flow field 48, and flows between the plurality of receivers 52b. The fuel gas flows through the plurality of discharge holes 54b to the surface 32b, and then, the fuel gas is discharged into the fuel gas discharge passage 38b.

Further, as shown in FIG. 2, after the coolant flows from the coolant supply passage 40a into the coolant flow field 62 between the first and second metal separators 32, 34, the coolant flows in the direction indicated by the arrow B (horizontal direction). After the coolant cools the MEA 30, the coolant is discharged from the coolant discharge passage 40b.

The embodiment of the present invention offers the following effects.

As shown in FIGS. 4 and 5, in the dummy electrode assembly 70, the first electrode 78 and the second electrode 80 are joined to both surfaces of the plate 76 through the adhesive layers 90, respectively. The adhesive layers 90 are disposed only in the second area R2 that lies outside the first area R1 corresponding to the power generation area R of the power generation cell 12 in the dummy electrode assembly 70. As described above, the adhesion portions of the dummy electrode assembly 70 are provided at positions which are not overlapped with the power generation area R in the stacking direction of the fuel cell stack 10. In the structure, it is possible to eliminate the influence on the power generation performance of the fuel cell stack 10 by the adhesive layers 90.

The adhesive layers 90 are provided at least at one end of the dummy electrode assembly 70 in a direction corresponding to a reactant gas flow direction of the power generation cell 12 (in the direction indicated by the arrow C). In the structure, the adhesion positions of the dummy electrode assembly 70 can be set in a manner that the adhesion portions easily avoid the first area R1 corresponding to the power generation area R.

In the dummy electrode assembly 70, the adhesive layers 90 are provided at positions corresponding to the buffers 50a, 50b, 58a, 58b serving as gas channels adjacent to the power generation area R of the power generation cell 12. Even in the state where the cells are stacked together, since no stacking load is applied to the positions corresponding to the buffers 50a, 50b, 58a, 58b, it is possible to eliminate the influence on the seal surface pressure distribution in the seal member (first seal member 64, etc.) due to the thickness (steps or unevenness) of the adhesive layers 90. That is, even in the state where the cells are stacked together, since the adhesion portion of the dummy electrode assembly 70 is positioned in a manner that no tightening load is applied to the adhesion portions, it is possible to prevent non-uniformity of the seal surface pressure resulting from the thickness, etc., of the adhesive layers 90.

The adhesive layer 90 includes the plurality of dot-shaped adhesion portions 92. In the structure, in comparison with a case of providing the adhesive layers 90 in large part of the second area R2, reduction in the consumption amount of the adhesive is achieved economically.

The above embodiment is summarized as follows:

The above embodiment discloses the dummy electrode assembly (70) having no power generation function and being used instead of the membrane electrode assembly (30), in the dummy cell (15a, 15b). The dummy cell is disposed at least at one end of the cell stack body (14) in the fuel cell stack (10). The cell stack body includes the plurality of power generation cells (12) that are stacked together in the stacking direction. The dummy electrode assembly includes an electrically conductive plate (76) used instead of an electrolyte membrane, and a pair of electrodes (78, 80) joined to both surfaces of the plate through adhesive layers (90), respectively. The pair of electrodes have different sizes in a plan view. The adhesive layers are disposed only in a second area (R2) that lies outside the first area (R1) corresponding to the power generation area (R) of the power generation cell, in the dummy electrode assembly.

The adhesive layers are provided at least at one end of the dummy electrode assembly in a direction corresponding to a reactant gas flow direction of the power generation cell.

The adhesive layers are provided at a position, on the dummy electrode assembly, corresponding to the buffer (50a, 50b, 58a, 58b) serving as a gas channel adjacent to the power generation area of the power generation cell.

The adhesive layer includes a plurality of dot-shaped adhesion portions (92).

The above embodiment discloses the fuel cell stack (10) including the cell stack body (14) including a plurality of power generation cells (12) stacked together. The dummy cell (15a, 15b) is disposed at least at one end of the cell stack body in the stacking direction. The dummy cell includes the dummy electrode assembly (70) having no power generation function, instead of the membrane electrode assembly. The dummy electrode assembly includes the plate (76) used instead of an electrolyte membrane, and the pair of electrodes (78, 80) joined to both surfaces of the plate through adhesive layers (90), respectively. The pair of electrodes have different sizes in a plan view. The adhesive layers are disposed only in a second area (R2) that lies outside a first area (R1) corresponding to a power generation area (R) of the power generation cell in the dummy electrode assembly.

The above embodiment discloses the method of producing the dummy electrode assembly (70). The dummy electrode assembly (70) has no power generation function and is used instead of the membrane electrode assembly (30) in the dummy cell (15a, 15b). The dummy cell is disposed at least at one end of the cell stack body (14) in the fuel cell stack (10). The cell stack body includes the plurality of power generation cells (12) that are stacked together in the stacking direction. The method includes the member providing step (S1) of providing the plate (76) used instead of an electrolyte membrane (42), and the pair of electrodes (78, 80) having different sizes in a plan view, and a joining step (S2) of joining the pair of electrodes to both surfaces of the plate through the adhesive layers (90) respectively. In the joining step, the adhesive layers are disposed only in a second area (R2) that lies outside a first area (R1) corresponding to the power generation area (R) of the power generation cell, in the dummy electrode assembly.

The present invention is not limited to the above described embodiments. Various modifications can be made without departing from the gist of the present invention.

What is claimed is:

1. A dummy electrode assembly having no power generation function, the dummy electrode assembly being used instead of a membrane electrode assembly, in a dummy cell, the dummy cell being disposed at least at one end of a cell stack body in a fuel cell stack, the cell stack body comprising a plurality of power generation cells that are stacked together in a stacking direction,
   the dummy electrode assembly comprising:
   an electrically conductive plate used instead of an electrolyte membrane; and
   a pair of electrodes joined to both surfaces of the plate through adhesive layers, respectively, the pair of electrodes having different sizes in a plan view,
   wherein the adhesive layers are disposed only in a second area that lies outside a first area corresponding to a power generation area of the power generation cell, in the dummy electrode assembly, and
   the adhesive layers of the dummy electrode assembly overlap with buffers serving as gas channels adjacent to the power generation area of the power generation cell in the stacking direction.

2. The dummy electrode assembly according to claim 1, wherein the adhesive layers are provided at least at one end of the dummy electrode assembly in a direction corresponding to a reactant gas flow direction of the power generation cell.

3. The dummy electrode assembly according to claim 1, wherein the adhesive layers are provided at each of both ends of the dummy electrode assembly in a direction corresponding to a reactant gas flow direction of the power generation cell.

4. The dummy electrode assembly according to claim 1, wherein the adhesive layers comprise a first adhesive layer provided on one surface of the plate, and a second adhesive layer provided on another surface of the plate;
- one of the pair of electrodes is joined to the one surface of the plate through the first adhesive layer, and
- another of the pair of electrodes is joined to the other surface of the plate through the second adhesive layer.

5. The dummy electrode assembly according to claim 1, wherein the adhesive layer includes a plurality of dot-shaped adhesion portions.

6. The dummy electrode assembly according to claim 5, wherein the plurality of dot-shaped adhesion portions are spaced from each other in a short side direction of the dummy electrode assembly.

7. A fuel cell stack comprising a cell stack body including a plurality of power generation cells stacked together, a dummy cell being disposed at least at one end of the cell stack body in a stacking direction, the dummy cell including a dummy electrode assembly having no power generation function, instead of a membrane electrode assembly, the dummy electrode assembly comprising:
- a plate used instead of an electrolyte membrane; and
- a pair of electrodes joined to both surfaces of the plate through adhesive layers, respectively, the pair of electrodes having different sizes in a plan view,
- wherein the adhesive layers are disposed only in a second area that lies outside a first area corresponding to a power generation area of the power generation cell in the dummy electrode assembly, and the adhesive layers of the dummy electrode assembly overlap with buffers serving as gas channels adjacent to the power generation area of the power generation cell in the stacking direction.

8. The fuel cell stack according to claim 7, wherein the adhesive layers are provided at least at one end of the dummy electrode assembly in a direction corresponding to a reactant gas flow direction of the power generation cell.

9. The fuel cell stack according to claim 7, wherein the adhesive layers are provided at each of both ends of the dummy electrode assembly in a direction corresponding to a reactant gas flow direction of the power generation cell.

10. The dummy electrode assembly according to claim 7, wherein the adhesive layers comprise a first adhesive layer provided on one surface of the plate, and a second adhesive layer provided on another surface of the plate;
- one of the pair of electrodes is joined to the one surface of the plate through the first adhesive layer, and another of the pair of electrodes is joined to the other surface of the plate through the second adhesive layer.

11. The fuel cell stack according to claim 7, wherein the adhesive layer includes a plurality of dot-shaped adhesion portions.

12. The fuel cell stack according to claim 11, wherein the plurality of dot-shaped adhesion portions are spaced from each other in a short side direction of the dummy electrode assembly.

* * * * *